(12) United States Patent
Park et al.

(10) Patent No.: US 7,911,566 B2
(45) Date of Patent: Mar. 22, 2011

(54) COLOR FILTERS OF LIQUID CRYSTAL DISPLAY AND METHOD FOR FABRICATING THE SAME

(75) Inventors: Choon-Ho Park, Gyeonggi-Do (KR); Jung-Jae Lee, Gyeonggi-Do (KR)

(73) Assignee: LG Display Co, Ltd., Seoul (KR)

( * ) Notice: Subject to any disclaimer, the term of this patent is extended or adjusted under 35 U.S.C. 154(b) by 435 days.

(21) Appl. No.: 12/076,262

(22) Filed: Mar. 14, 2008

(65) Prior Publication Data
US 2008/0225213 A1    Sep. 18, 2008

(30) Foreign Application Priority Data
Mar. 14, 2007  (KR) .................. 10-2007-0025111

(51) Int. Cl.
*G02F 1/1335* (2006.01)
(52) U.S. Cl. ...................... 349/106; 349/108
(58) Field of Classification Search .................. 349/106, 349/108
See application file for complete search history.

(56) References Cited

U.S. PATENT DOCUMENTS

| | | | |
|---|---|---|---|
| 6,980,176 B2 * | 12/2005 | Matsumoto et al. | 345/6 |
| 2006/0139517 A1 | 6/2006 | Ahn et al. | |
| 2007/0008462 A1 * | 1/2007 | Yang et al. | 349/106 |

FOREIGN PATENT DOCUMENTS

| | | |
|---|---|---|
| CN | 1892263 | 1/2007 |
| JP | 10-307205 | 11/1998 |

OTHER PUBLICATIONS

Yang et al., "31.1: Development of Six Primary-Color LCD", SID 05 Digest, May 24, 2005, pp. 1210-1213.

* cited by examiner

*Primary Examiner* — Mike Qi
(74) *Attorney, Agent, or Firm* — McKenna Long & Aldridge LLP (57) ABSTRACT

A liquid crystal display includes: a color filter substrate; and a plurality of pixels formed in a matrix form on the color filter substrate, each pixel including a first red sub-pixel, a first green sub-pixel, a first blue sub-pixel, a pair of second red sub-pixel and third green sub-pixel, a pair of second green sub-pixel and third blue sub-pixel, and a pair of second blue sub-pixel and third red sub-pixel.

16 Claims, 9 Drawing Sheets

COLOR FILTERS OF LIQUID CRYSTAL DISPLAY AND METHOD FOR FABRICATING THE SAME

This application claims the benefit of Korean Patent Application No. 10-2007-0025111, filed on Mar. 14, 2007, which is hereby incorporated by reference for all purposes as if fully set forth herein.

BACKGROUND OF THE INVENTION

1. Field of the Invention

The present invention relates to a color filter of a liquid crystal display (LCD) and, more particularly, to a color filter of an LCD that can implement 6 primary colors by adding cyan (C), magenta (M) and yellow (Y) complementary colors to a color reproduction range using the existing red (R), green (G) and blue (B).

2. Discussion of the Related Art

In general, an LCD includes two display panels and a liquid crystal layer, which has dielectric anisotropy, interposed between the two display panels.

In the LCD, an electric field is applied to the liquid crystal layer, and the strength of the electric field is controlled to adjust transmittance of light that passes through the liquid crystal layer to obtain a desired image.

The LCD is a typical device among portable flat panel displays (FPDs), and a thin film transistor (TFT) LCD including TFTs as switching elements is commonly used.

The LCD includes a plurality of sub-pixels including pixel electrodes (not shown) and red, green and blue color filters.

Each sub-pixel is driven by a signal applied via a display signal line to perform a display operation.

Signal lines include gate lines (or scan signal lines) that transfer scan signals and data lines that transfer data signals. Each sub-pixel includes a TFT which is connected with a single gate line and a single data line, through which an image signal transferred to a pixel electrode formed in the sub-pixel is controlled.

In the related art LCD, the red (R), green (G) and blue (B) color filters are arranged in various forms.

For example, in a stripe type color filter arrangement, the same color filters are arranged in units of sub-pixel rows. In a mosaic type color filter arrangement, the red (R), green (G) and blue (B) color filters are sequentially arranged in rows and columns. In a delta type color filter arrangement, sub-pixels are disposed in zigzags in a column direction, and red (R), green (G) and blue (B) color filters are sequentially arranged.

The related art LCD using the delta-type color filter arrangement method will now be described with reference to FIGS. 1 and 2.

Figure 1:
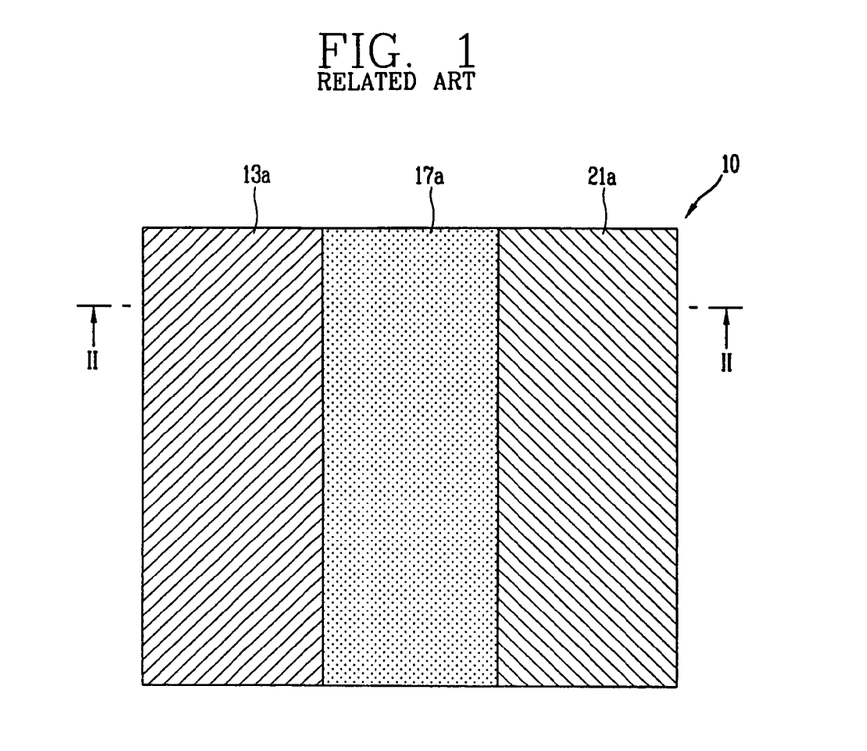
FIG. 1 is a plan view showing sub-pixels constituting a single pixel of a liquid crystal display (LCD) according to the related art.
Figure 2:
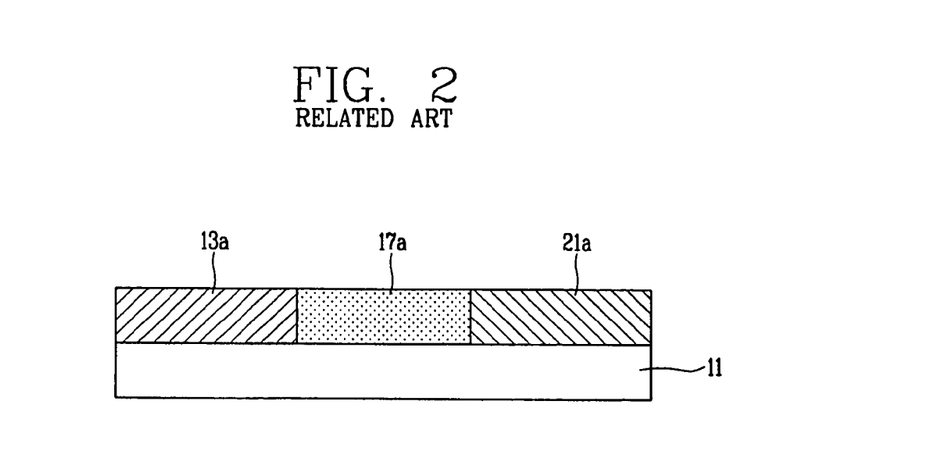
FIG. 2 is a sectional view of the sub-pixels constituting a single pixel of the LCD, taken along line II-II in FIG. 1.

FIG. 1 is a plan view showing sub-pixels constituting a single pixel of the related art LCD, and FIG. 2 is a sectional view of the sub-pixels constituting a single pixel of the LCD, taken along line II-II in FIG. 1.

Although not shown, the related art LCD may include a liquid crystal panel that displays a desired image, and a backlight unit that supplies light to the liquid crystal panel.

Here, the liquid crystal panel (not shown) includes a TFT array substrate (not shown) on which TFTs are formed, a color filter substrate (not shown) which is attached to the TFT array substrate and includes red (R), green (G) and blue (B) color filters, and a liquid crystal layer (not shown) filled between the TFT array substrate and the color filter substrate.

A backlight unit of the LCD includes a plurality of lamps to provide light to the liquid crystal panel.

With reference to FIG. 1 and FIG. 2, three sub-pixels including red (R), green (G) and blue (B) color filters 13a, 17a and 21a constituting a single unit pixel 10 are formed on the color filter substrate 11. Here, the color filters 13a, 17a and 21a will be considered to refer to the sub-pixels.

The red (R), green (G) and blue (B) color filters 13a, 17a and 21a are arranged in a column direction.

A black matrix layer (not shown) is formed to block light at boundaries of the red (R), green (G) and blue (B) color filters 13a, 17a and 21a.

The method for fabricating the color filters of the LCD according to the related art having such array structure will now be described with reference to FIGS. 3a to 3e.

FIGS. 3a to 3e are sectional views sequentially showing the process of fabricating sub-pixels constituting a single pixel of the related art LCD.

Figure 3A:
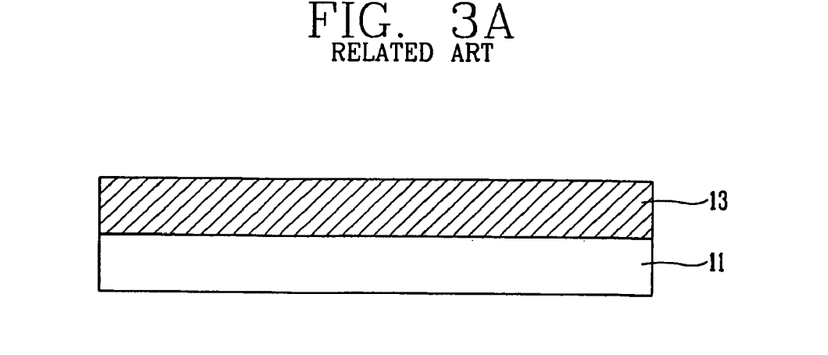
FIGS. 3a through and including 3e are sectional views sequentially showing the process of fabricating sub-pixels of a single pixel of the LCD according to the related art.

With reference to FIG. 3A, first, a black matrix layer (not shown) is formed on the color filter substrate 11, a glass substrate, for example, with an opaque material in order to prevent light transmission to portions other than the unit pixel area.

Next, one of a color, which is among red, green and blue, resin layer is coated on the color filter substrate 11 including the black matrix layer (not shown). Here, for example, the red color resin layer 13, among the red, green and blue color resin layers, may first be coated.

Then, the red color resin layer 13 is selectively removed through exposing and developing processes using photolithography to form a red color resin layer pattern 13a. In this case, the red color resin layer pattern 13a is used as a red color filter and corresponds to the red sub-pixel.

Figure 3B:
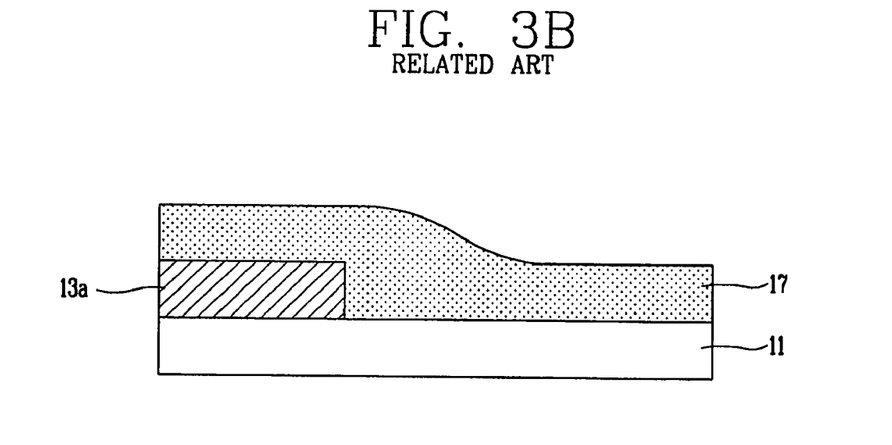

Subsequently, as shown in FIG. 3b, a green (G) color resin layer 17 is coated on the color filter substrate 11 including the red color resin layer pattern 13a.

Figure 3C:
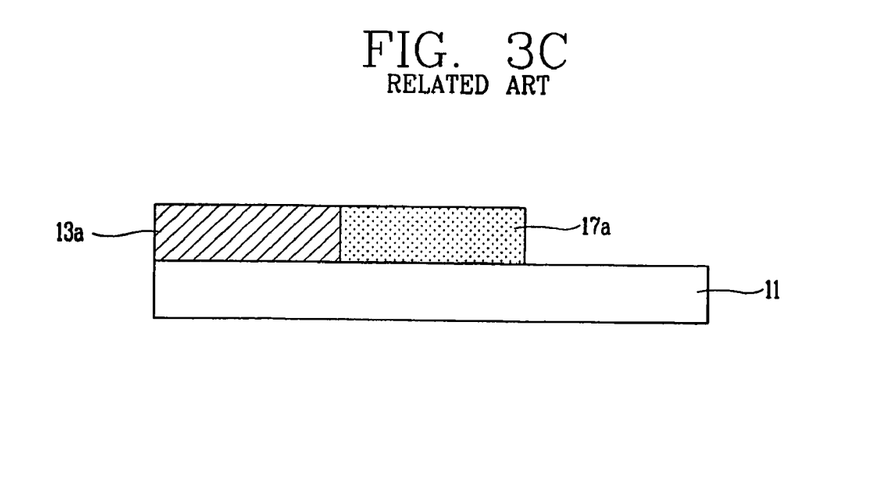

Then, as shown in FIG. 3c, the green color resin layer 17 is selectively removed through exposing and developing processes using photolithography to form the green color resin layer pattern 17a. In this case, the green color resin layer pattern 17a is used as a green color filter and corresponds to the green sub-pixel.

Figure 3D:
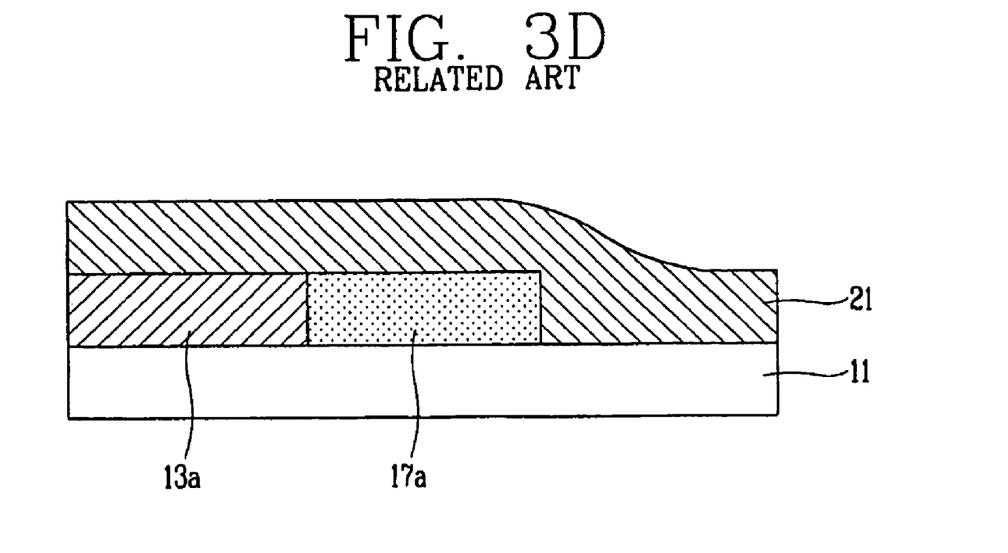

Thereafter, as shown in FIG. 3d, a blue (B) color resin layer 21 is coated on the color filter substrate 11 including the red and green color resin layer patterns 13a and 17a.

Figure 3E:
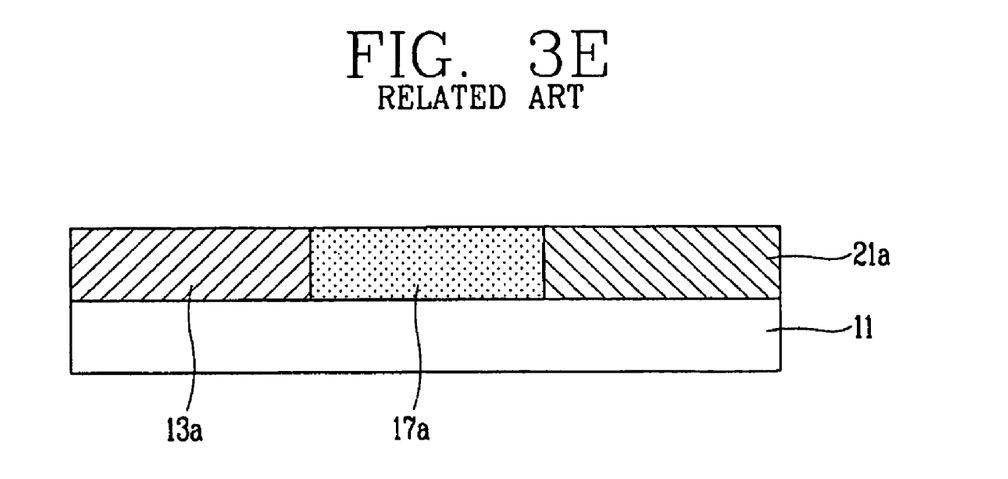

And then, as shown in FIG. 3e, the blue color resin layer 21 is selectively removed through exposing and developing processes using photolithography to form the blue color resin layer pattern 21a. In this case, the blue color resin layer pattern 21a is used as a blue color filter and corresponds to a blue sub-pixel.

The color filters of the related art LCD fabricated as described above and the fabrication method have the following problems.

Figure 4:
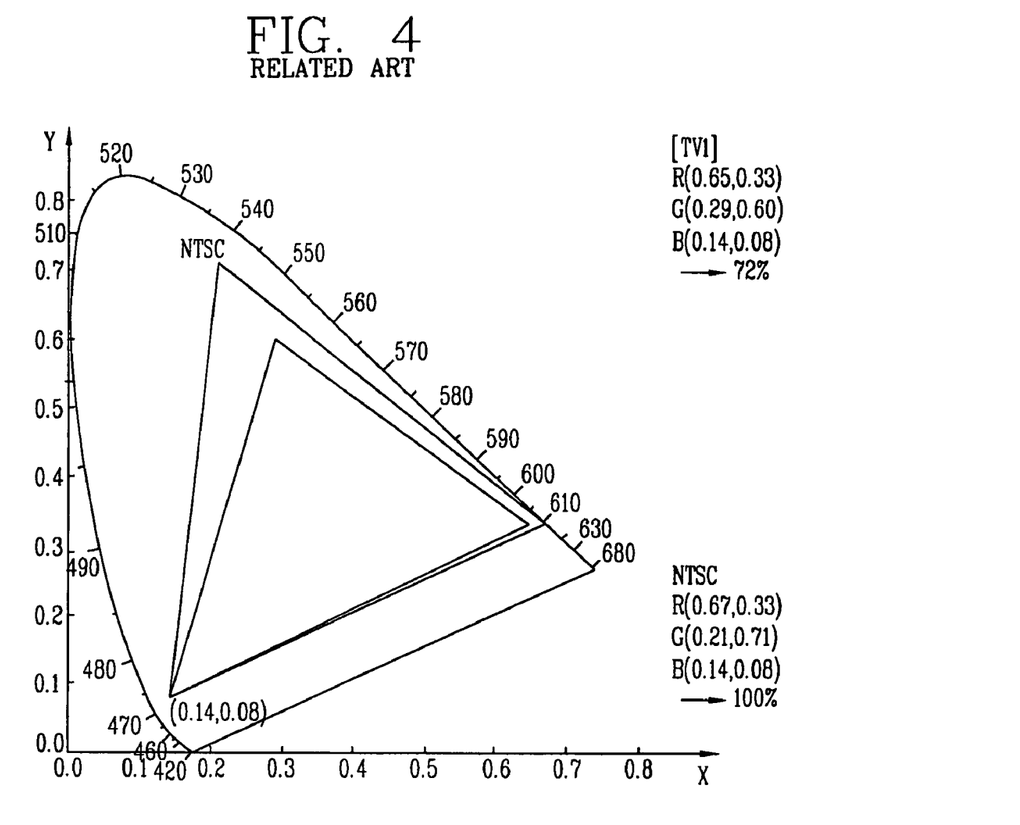
FIG. 4 is a graph showing a color coordinate of a color filter of the LCD according to the related art.

That is, in the color filters of the related art LCD and its fabrication method, only the three R, G and B colors are used to form the color filters, and as shown in FIG. 4, formation of the color filters with three colors has limited color reproduction characteristics close to the natural colors.

Thus, a method of adding three cyan, magenta and yellow color filters to the three R, G and B color filters has been proposed, which, however, has failed to be employed for mass production because it incurs high fabrication costs for development of additional color inks (cyan, magenta and yellow) and an additional photo process.

SUMMARY OF THE INVENTION

Therefore, in order to address the above matters the various features described herein have been conceived. One aspect of the exemplary embodiments is to provide a color filter of a liquid crystal display (LCD) capable of implementing six colors including red (R), green (G) and blue (B) without additional inks or processes by using complementary characteristics of the red (R), green (G) and blue (B), and its fabrication method.

This present invention provides an LCD including: a color filter substrate; and a plurality of pixels formed in a matrix form on the color filter substrate, each pixel including a first red sub-pixel, a first green sub-pixel, a first blue sub-pixel, a pair of second red sub-pixel and third green sub-pixel, a pair of second green sub-pixel and third blue sub-pixel, and a pair of second blue sub-pixel and third red sub-pixel.

This present invention also provides an LCD including: a thin film transistor (TFT) array substrate; a color filter substrate attached to the TFT array substrate; a plurality of pixels formed in a matrix form on the color filter substrate, each pixel including a first red sub-pixel, a first green sub-pixel, a first blue sub-pixel, a pair of second red sub-pixel and third green sub-pixel, a pair of second green sub-pixel and third blue sub-pixel, and a pair of second blue sub-pixel and third red sub-pixel; and a liquid crystal layer formed between the TFT array substrate and the color filter substrate.

This present invention also provides a method for fabricating color filters of an LCD, including: providing a color filter substrate; and forming a plurality of pixels on the color filter substrate, wherein the forming of the plurality of pixels includes: forming first to third red sub-pixels on the color filter substrate; forming first to third green sub-pixels on other portions of the color filter substrate than the area where the first to third red sub-pixels have been formed; and forming first to third blue sub-pixels on other portions of the color filter substrate than the area where the first to third green sub-pixels and the first to third red sub-pixels have been formed.

This present invention also provides a method for fabricating an LCD, including: providing a color filter substrate; and forming a plurality of pixels on the color filter substrate, wherein the forming of the plurality of pixels includes: forming first to third red color resin layer patterns on the color filter substrate; forming first to third green sub-pixels on other portions of the color filter substrate than the area where the first to third red color resin layer patterns have been formed; and forming first to third blue color resin layer patterns on other portions of the color filter substrate than the area where the first to third green color resin layer patterns and the first to third red color resin layer patterns have been formed.

These and other advantages of the present invention will become more apparent from the following detailed description of the present invention when taken in conjunction with the accompanying drawings.

BRIEF DESCRIPTION OF THE DRAWINGS

FIGS. 7a and 7b are sectional views constituting a single pixel of the LCD according to an exemplary embodiment of the present invention, wherein

DETAILED DESCRIPTION OF THE ILLUSTRATED EMBODIMENTS

Color filters of a liquid crystal display (LCD) and its fabrication method according to an exemplary embodiment of the present invention will now be described in detail with reference to the accompanying drawings.

Figure 5:
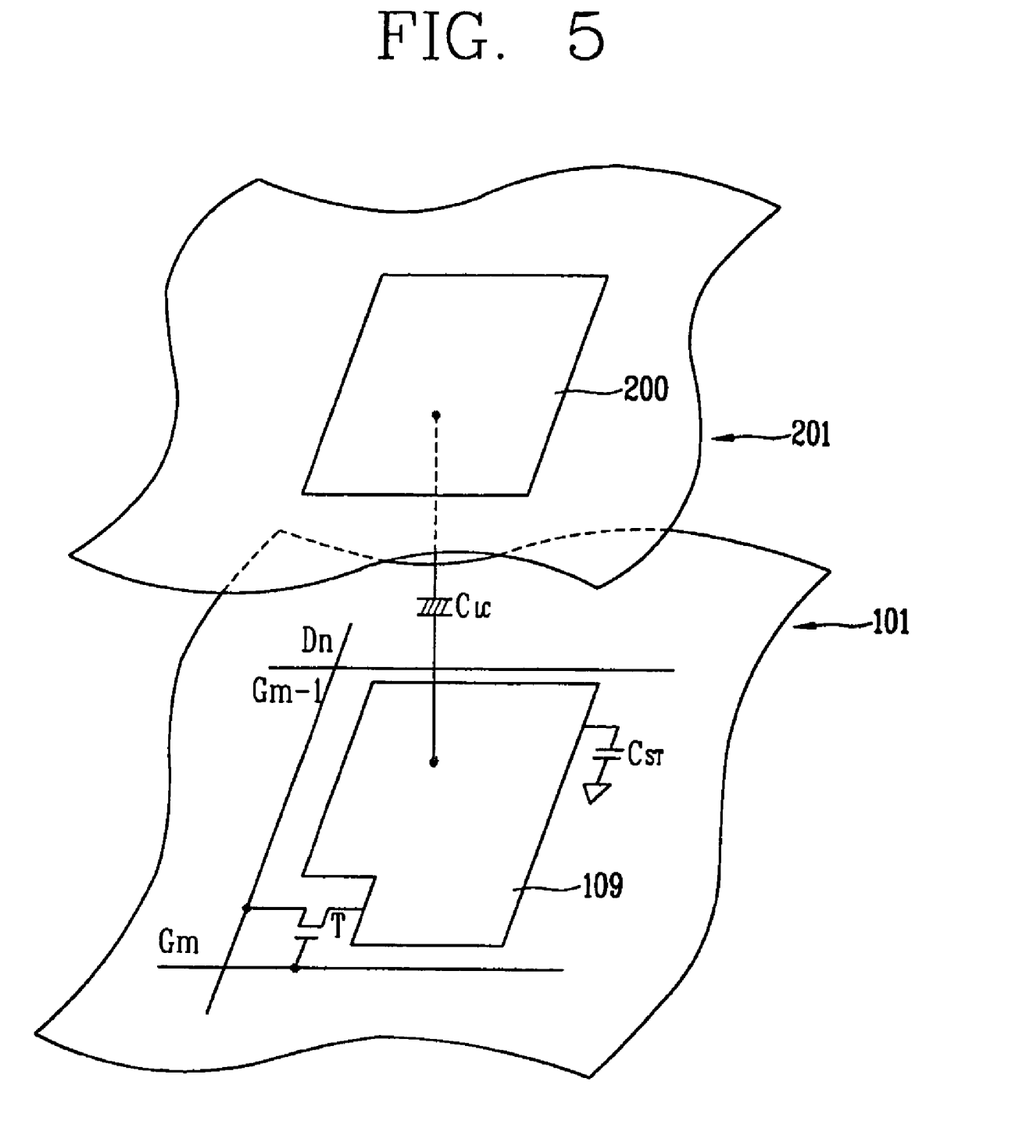
FIG. 5 is an equivalent circuit diagram of a single sub-pixel of an LCD according to an exemplary embodiment of the present invention.

FIG. 5 is an equivalent circuit diagram of a single sub-pixel of an LCD according to an exemplary embodiment of the present invention.

Figure 6:
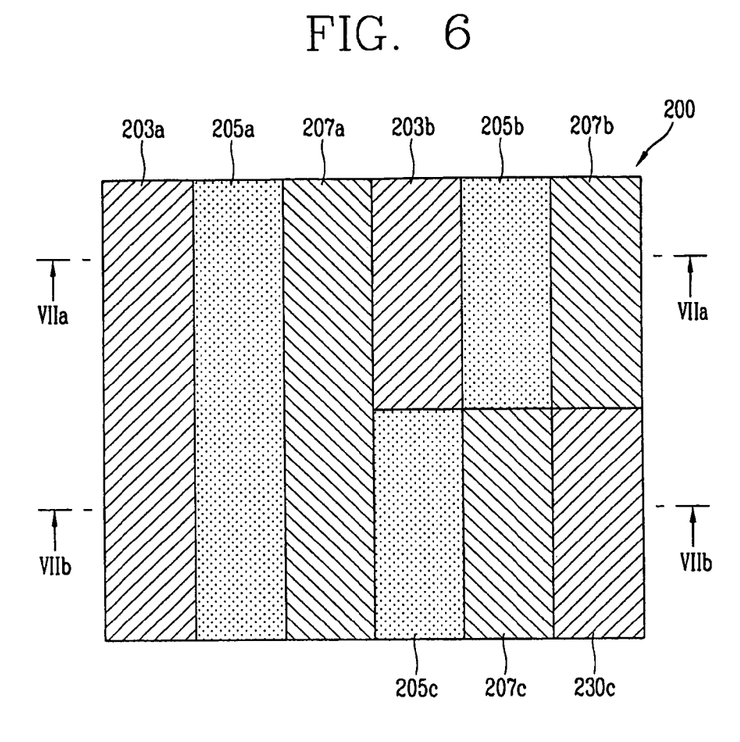
FIG. 6 is a plan view of sub-pixels constituting a single pixel of the LCD according to an exemplary embodiment of the present invention.

FIG. 6 is a plan view of sub-pixels constituting a single pixel of the LCD according to an exemplary embodiment of the present invention.

Figure 7A:
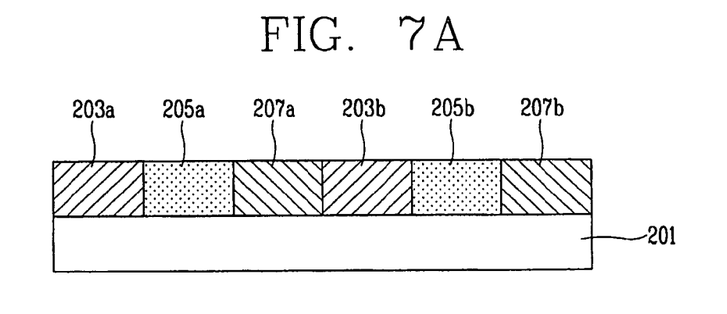
FIG. 7a is a sectional view taken along line VIIa-VIIa in FIG. 6.
Figure 7B:
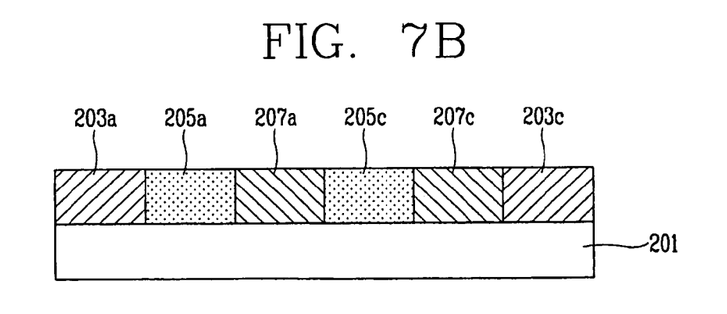
FIG. 7b is a sectional view taken along line VIIb-VIIb in FIG. 6.

FIGS. 7a and 7b are sectional views constituting a single pixel of the LCD according to an exemplary embodiment of the present invention, wherein FIG. 7a is a sectional view taken along line VIIa-VIIa in FIG. 6, and FIG. 7b is a sectional view taken along line VIIb-VIIb in FIG. 6.

Figure 8A:
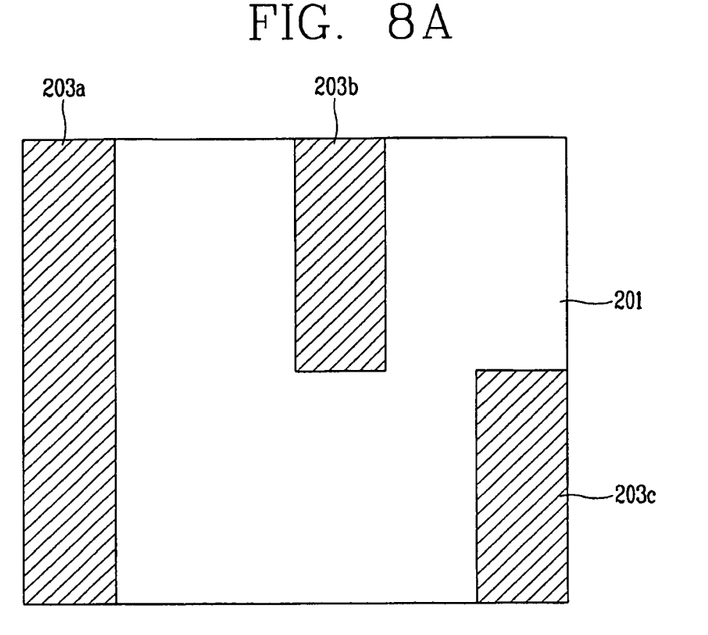
FIG. 8a to 8c are plan views for explaining the process of forming sub-pixels of a single pixel of the LCD according to an exemplary embodiment of the present invention.
Figure 8B:
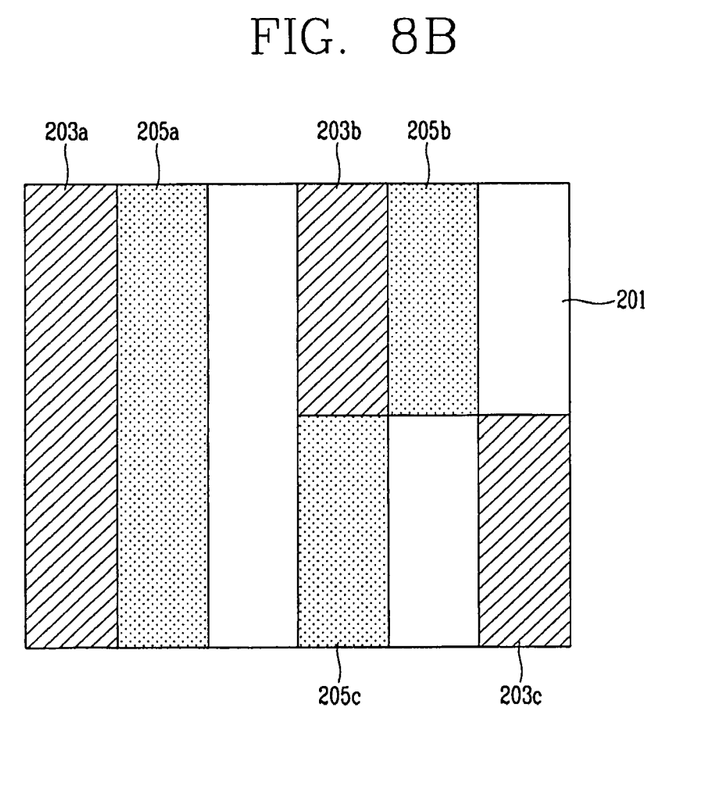
Figure 8C:
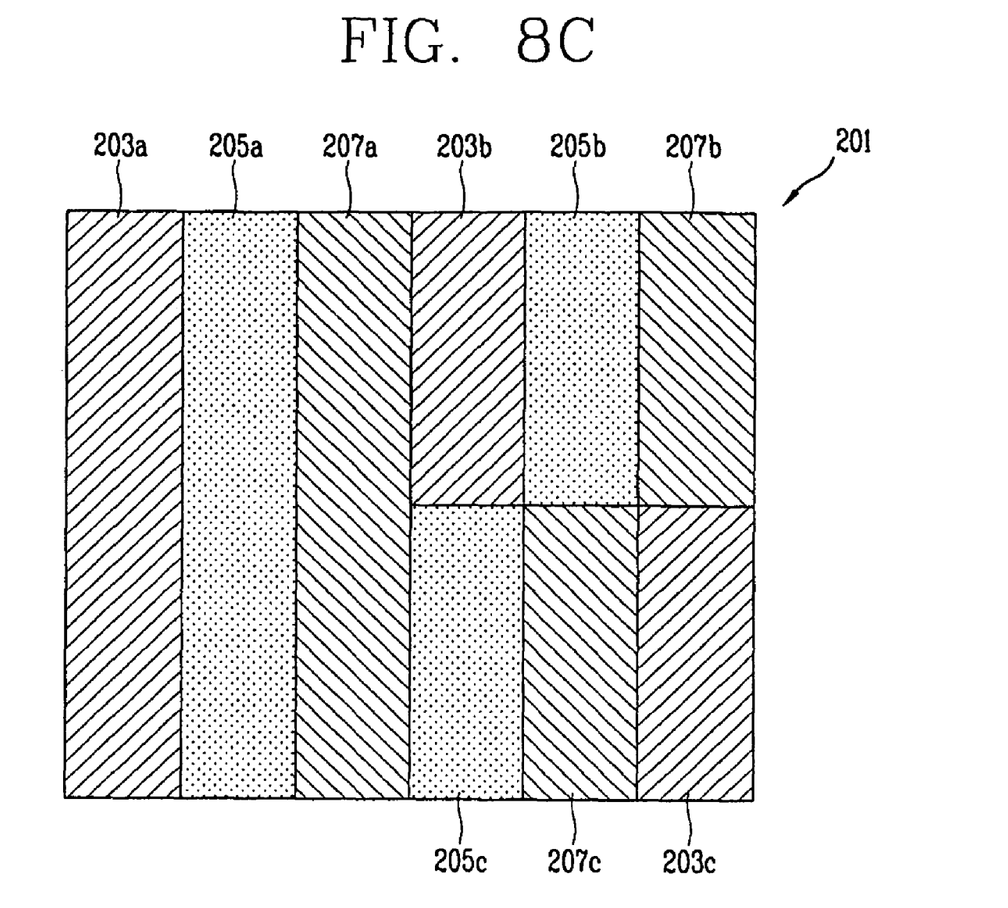

FIG. 8a to 8c are plan views for explaining the process of forming sub-pixels of a single pixel of the LCD according to an exemplary embodiment of the present invention.

With reference to FIG. 5, the LCD according to an exemplary embodiment of the present invention includes a liquid crystal panel including a thin film transistor (TFT) array substrate 101, a color filter substrate 201 with red (R), green (G) and blue (B) color filters formed thereon, and a liquid crystal layer (not shown) filled between the substrates, and a backlight unit (not shown) that provides light to the liquid crystal panel.

A plurality of gate lines Gm−1 and Gm and a plurality of data lines Dn are arranged to cross each other to form a sub-pixel area on the TFT array substrate 101, and a TFT (T), a switching element, is formed at each crossing of the gate lines and the data lines.

A pixel electrode 109 is connected with the TFT (T) formed at each sub-pixel area.

Each sub-pixel includes the TFT (T), the switching element, connected with the gate lines Gm−1 and Gm and the data line Dn, a liquid crystal capacitor Clc connected to the TFT (T), and a storage capacitor Cst. In this case, the storage capacitor may be omitted as necessary.

The liquid crystal capacitor Clc uses the pixel electrode 109 of the lower array substrate 101 and a common electrode (not shown) of the upper color filter substrate 201 as two terminals, and the liquid crystal layer (not shown) between the two electrodes serves as a dielectric substance.

The pixel electrode 109 is connected with the TFT (T), and the common electrode (not shown) is formed on the upper color filter substrate 201 and receives a common voltage Vcom.

The common electrode (not shown) may be provided on the lower array substrate 101, and in this case, the pixel electrode 109 and the common electrode (not shown) may be formed in a linear or bar shape.

The backlight unit (not shown) of the LCD includes a plurality of lamps to provide light to the liquid crystal panel. In this case, as the lamps, CCFLs (Cold Cathode Fluorescent Lamp), EEFLs (External Electrode Fluorescent Lamps), LEDs (Light Emitting Diodes), and the like, can be used.

On the color filter substrates, a plurality of pairs of sub-pixels that implement cyan (C), magenta (M) and yellow (Y) colors together with red (R), green (G), and blue (B) colors form a single pixel as a basic unit of an image.

Although not shown, black matrixes are formed at boundaries of sub-pixels to prevent light transmission. Here, it is assumed that the black matrixes are formed at boundaries of the respective sub-pixels in the following description.

The disposition structure and disposition method of sub-pixels of the color filter substrates of the LCD according to an exemplary embodiment of the present invention will now be described in detail.

FIG. 6 is a plan view of sub-pixels constituting a single pixel of the LCD according to an exemplary embodiment of the present invention.

FIGS. 7a and 7b are sectional views constituting a single pixel of the LCD according to an exemplary embodiment of the present invention, wherein FIG. 7a is a sectional view taken along line VIIa-VIIa in FIG. 6, and FIG. 7b is a sectional view taken along line VIIb-VIIb in FIG. 6.

With reference to FIGS. 6 and 7a and 7b, the sub-pixels of a single pixel 200 of the color filters of the LCD according to an exemplary embodiment of the present invention has a basic structure of 1×6 matrix. Of the sub-pixels, the first, red (R), the first green (G) and the first blue (B) sub-pixels 203a, 205a and 207a are disposed at the three rows, and pairs of sub-pixels are formed at the remaining rows in a 2×3 matrix form.

In detail, in the 2×3 matrix form, a second red sub-pixel 203b and a third green sup-pixel 205c make a pair in a first column, a second green sub-pixel 20b and a third blue sub-pixel 207c make a pair in a second column, and a second blue sub-pixel 207b and a third red sub-pixel 203c make a pair in a third column.

Here, the pair of second red sub-pixel 203b and the third green sub-pixel 205c implement yellow color, the pair of second green sub-pixel 205b and third blue sub-pixel 207c implement cyan color, and the pair of second blue sub-pixel 207b and third red sub-pixel 203c implement magenta color.

In this manner the red, green, blue, cyan, magenta and yellow colors are implemented by the nine sub-pixels (namely, color filters) constituting the single pixel 200.

The method for forming a plurality of sub-pixels constituting a single pixel of the color filter will now be described with reference to FIGS. 8a to 8c.

FIG. 8a to 8c are plan views for explaining the process of forming sub-pixels of a single pixel of the LCD according to an exemplary embodiment of the present invention.

Although not shown, one of red, green and blue color filter resin layers not shown) is coated on the color filter substrate 201. Here, a case where a red color resin layer 13, among the red, green and blue color resin layers, is first coated will be taken as an example.

In this case, major components of the color resin layer include photopolymerization type photosensitive composition such as a photopolymerization initiator, monomer, a binder, and organic pigments assuming R, G and B and their similar colors.

Although not shown, a black matrix layer (not shown) is formed with an opaque material to prevent light from transmitting through other portions than unit pixel areas on the color filter substrate 201 at a previous stage before the red color resin layer is coated. Here, it is assumed that the black matrix is formed at boundaries of the respective sub-pixels in the following description.

Subsequently, with reference to FIG. 8a, the red color resin layer (not shown) is selectively removed through exposing and developing processes using photolithography to form red color resin layer patterns 203a, 203b and 203c. In this case, the red color resin layer patterns 203a, 203b and 230c are used as the first to third red sub-pixels 203a, 203b and 230c.

Among the sub-pixels 203a, 203b and 203c, the second and third red sub-pixels 203b and 203c are disposed in columns different from that of the first red sub-pixel 203a, and respectively have an area corresponding to a half of or smaller than that of the first red sub-pixel 203a.

Thereafter, although not shown, a green color resin layer (not shown) is formed on the color filter substrate 201 including the red color resin layer patterns 203a, 230b and 203c.

And then, as shown in FIG. 8b, the green color resin layer (not shown) is selectively removed through exposing and developing processes using photolithography to form green color resin layer patterns 205a, 205b and 205c. In this case, the green color resin layer patterns 205a, 205b and 205c can be used as first to third green sub-pixels 205a, 205b and 205c.

Among the green sub-pixels 205a, 205b and 205c, the second and third green sub-pixels 205b and 205c are disposed in columns different from that of the first green sub-pixel 205a and respectively have an area corresponding to a half of or smaller than that of the first green sub-pixel 205a.

The green sub-pixels 205a, 205b and 205c do not overlap with the red sub-pixels 203a, 203b and 203c.

The second green sub-pixel 205b is disposed in the a different column from that of the second red sub-pixel 203b, and the third green sub-pixel 205c is disposed in the same column as the second red sub-pixel 203b. The third green sub-pixel 205c and the second red sub-pixel 203b disposed in the same column implement the yellow color.

Subsequently, although not shown, a blue color resin layer (not shown) is formed on the color filter substrate 201 including the red color resin layer patterns 203a, 203b and 203c and the green color resin layer patterns 205a, 205b and 205c.

And then, as shown in FIG. 8c, the blue color resin layer (not shown) is selectively removed through exposing and developing processes using photolithography to form the blue color resin layer patterns 207a, 207b and 207c, thus completing formation of the plurality of sub-pixels constituting a single pixel.

In this case, the red color resin layer patterns 207a, 207b and 207c are used as first to third blue sub-pixels 207a, 207b and 207c.

The blue sub-pixels 207a, 207b and 207c do not overlap with the red sub-pixels 203a, 203b and 203c and the green sub-pixels 205a, 205b and 205c.

The second blue sub-pixel 207b is disposed in the same column in which the third red sub-pixel 203c is disposed, and the third blue sub-pixel 207c is disposed in the same column in which the second green sub-pixel 205b is disposed.

The second blue sub-pixel 207b and the red sub-pixel 203c disposed in the same column implement a magenta color, and the third blue sub-pixel 207c and the second green sub-pixel 205b disposed in the same column implement a cyan color.

Figure 9:
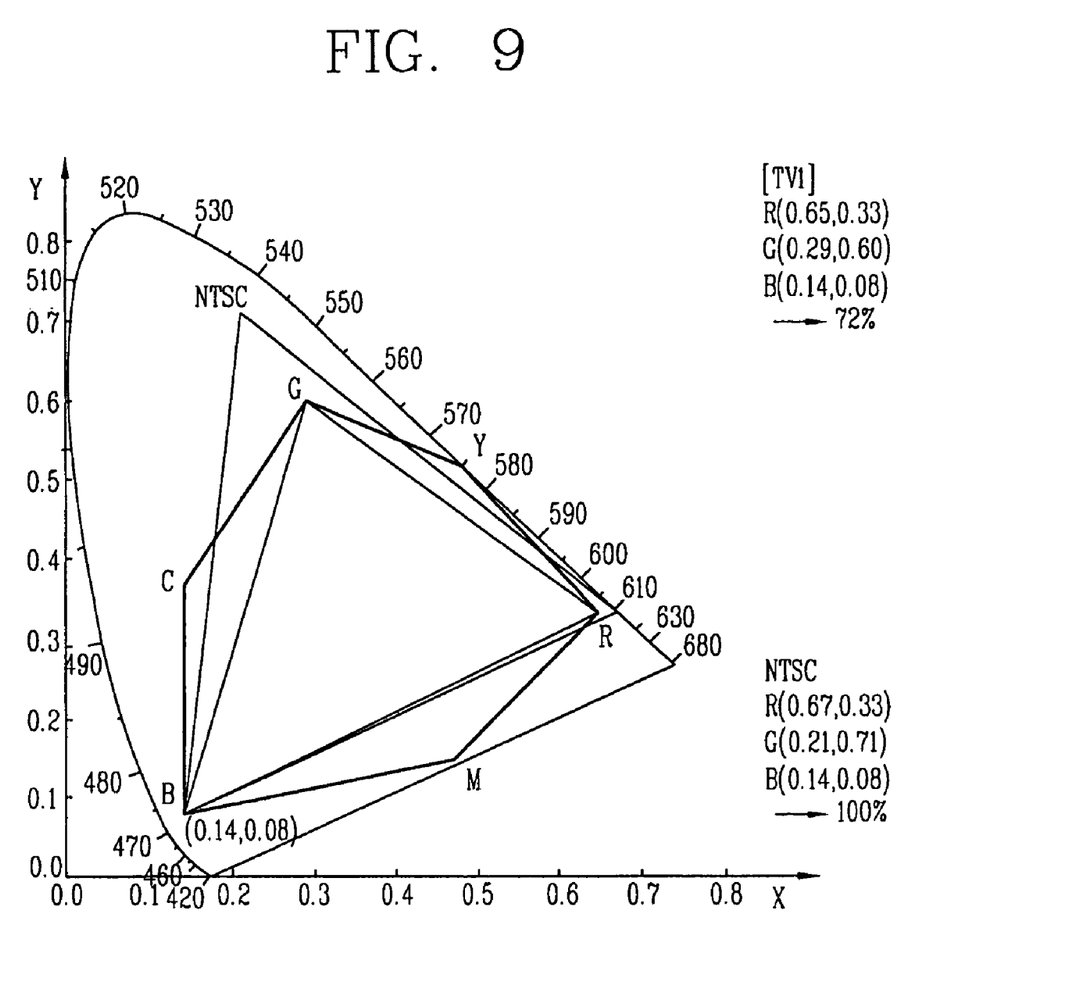
FIG. 9 is a graph showing a color coordinate of a color filter of the LCD according to an exemplary embodiment of the present invention.

By disposing the nine sub-pixels constituting a single pixel in such manners, a change in six color coordinates of the LCD as shown in FIG. 9 can be recognized.

Namely, in FIG. 9, the triangle in the color coordinates indicates a general color coordinates, and because cyan (C), magenta (M) and yellow (Y) color coordinates are added, every color within the hexagon can be implemented.

A method for fabricating the TFTs on the array substrate which is to be attached to the color filter substrate on which a plurality of sub-pixels are formed will now be described.

Although not shown, a gate metallic material is deposited on an insulation substrate made of transparent glass to form a gate metallic film, and the gate metallic film is selectively patterned through a masking process to form gate lines and gate electrodes protruded from the gate lines.

In this case, as the gate metallic material, a aluminum-based metal such as Al, an Al alloy, etc., a silver-based metal such as Ag, an Ag alloy, etc., a molybdenum-based metal such as Mo, an Mo alloy, etc., Cr, Ti, Ta, etc.

In addition, the gate metallic film may include two layers each having different physical properties, namely, a lower layer and an upper layer. The upper layer may be made of a metal with low resistivity, such as an aluminum-based metal or silver-based metal, in order to reduce a signal delay or a voltage drop of the gate line.

The lower layer may be made of a different material, in particular, a material having good physical, chemical and electrical contact characteristics with ITO (Indium Tin Oxide) or IZO (Indium Zinc Oxide). For example, the lower layer may be made of Ti, Ta, Cr, Mo-based metal, etc. The combination of the lower layer and the upper layer can be, for example, a Cr/Al—Nd alloy.

Next, a gate insulating layer made of silicon nitride (SiNx), etc., is formed on the insulation substrate including the gate lines and the gate electrodes.

Subsequently, a semiconductor layer made of hydrogenated amorphous silicon, etc., is formed on the gate insulating layer.

And then, an ohmic contact layer made of a material such as n+ hydrogenated amorphous silicon, etc., in which silicide or 'n' type impurities are doped with a high density, is formed on the semiconductor layer.

Thereafter, the ohmic contact layer and the semiconductor layer are selectively patterned through a masking process.

And then, a metallic material for data lines is deposited on the insulation substrate including the selectively patterned ohmic contact layer and semiconductor layer to form a metallic film for data lines, and the metallic film for data lies is then selectively patterned through a masking process to form a data line, a source electrode protruded from the data line, and a drain electrode spaced apart from the source electrode.

The data line and the gate line are formed to cross each other, and the source electrode and the drain electrode form the TFT, the switching element, together with the lower gate electrode. A channel of the TFT is formed at the semiconductor layer between the source electrode and the drain electrode.

The metallic film for data lines can be made of an aluminum-based metal, a silver-based metal, a molybdenum-based metal, Cr, Ti, Ta, etc., and may be formed as a multi-layer.

A protection layer made of an organic material having good planarization characteristics and photosensitivity, an insulation material having low dielectric constant characteristics, or silicon nitride, an in organic material, etc., is formed on the insulation substrate including the data line and the drain electrode.

And then, the protection layer is selectively patterned through a masking process to form a contact hole exposing a portion of the drain electrode in the protection layer.

Thereafter, a metallic material layer made of a transparent conductive material such as ITO or IZO or a reflective metal is deposited on the protection layer including the contact hole, and then selectively removed through a masking process to form a plurality of pixel electrodes. In this case, when data voltage is applied to the pixel electrodes, the pixel electrodes generate an electric field together with the common electrode of the upper color filter substrate which has been received a common voltage, to thus arrange liquid crystal molecules of the liquid crystal layer between the pixel electrodes and the common electrode.

In the above description, the common electrode is formed on the upper color filter substrate, and as mentioned above, it may be also formed on the lower insulation substrate as necessary.

The color filters of the LCD and its fabrication method according to the present invention have the following advantages.

First, because a plurality of sub-pixels constituting a single pixel are disposed in each different columns and in the same columns to add cyan (C), magenta (M) and yellow (Y) colors to the red (R), green (G) and blue (B) colors, the hexagon of six colors can be implemented, so color reproduction close to the natural colors can be implemented.

In particular, because the cyan (C), magenta (M) and yellow (Y) colors are implemented by using the complementary characteristics of red (R), green (G) and blue (B) colors, the six colors can be implemented without performing additional color filter forming process and masking process.

Therefore, because the six colors can be implemented without any additional process, the fabrication cost can be reduced and the color reproduction characteristics can be improved.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display device, comprising:
   a color filter substrate; and
   a plurality of pixels formed in a matrix form on the color filter substrate, each pixel including a first red sub-pixel, a first green sub-pixel, a first blue sub-pixel, a pair of second red sub-pixel and third green sub-pixel, a pair of second green sub-pixel and third blue sub-pixel, and a pair of second blue sub-pixel and third red sub-pixel, wherein the first red sub-pixel, the first green sub-pixel and the first blue sub-pixel, the pair of second red sub-pixel and third green sub-pixel, the pair of second green sub-pixel and third blue sub-pixel, and the pair of second blue sub-pixel and third red sub-pixel are disposed in different column respectively.

2. The device of claim 1, wherein the pair of second red sub-pixel and third green sub-pixel, the pair of second green sub-pixel and third blue sub-pixel, and the pair of second blue sub-pixel and third red sub-pixel are disposed in the in the same column respectively.

3. The device of claim 1, wherein the pair of second red sub-pixel and third green sub-pixel implement yellow (Y) color, the pair of second green sub-pixel and third blue sub-pixel implement cyan (C) color, and the pair of second blue sub-pixel and third red sub-pixel implement magenta (M) color.

4. A liquid crystal display device comprising:
- a thin film transistor (TFT) array substrate;
- a color filter substrate attached to the TFT array substrate;
- a plurality of pixels formed in a matrix form on the color filter substrate, each pixel including a first red sub-pixel, a first green sub-pixel, a first blue sub-pixel, a pair of second red sub-pixel and third green sub-pixel, a pair of second green sub-pixel and third blue sub-pixel, and a pair of second blue sub-pixel and third red sub-pixel, wherein the first red sub-pixel, the first green sub-pixel, the first blue sub-pixel, the pair of second red sub-pixel and third green sub-pixel, the pair of second green sub-pixel and third blue sub-pixel, and the pair of second blue sub-pixel and third red sub-pixel are disposed in different column, respectively; and
- a liquid crystal layer formed between the TFT array substrate and the color filter substrate.

5. The device of claim 4, wherein the pair of second red sub-pixel and third green sub-pixel, the pair of second green sub-pixel and third blue sub-pixel, and the pair of second blue sub-pixel and third red sub-pixel are disposed in the in the same column respectively.

6. The color filters of claim 4, wherein the pair of second red sub-pixel and third green sub-pixel implement yellow (Y) color, the pair of second green sub-pixel and third blue sub-pixel implement cyan (C) color, and the pair of second blue sub-pixel and third red sub-pixel implement magenta (M) color.

7. A method for fabricating color filters of a liquid crystal display, comprising:
- providing a color filter substrate; and
- forming a plurality of pixels on the color filter substrate, wherein the forming of the plurality of pixels comprises:
  - forming first to third red sub-pixels on the color filter substrate;
  - forming first to third green sub-pixels on other portions of the color filter substrate than the area where the first to third red sub-pixels have been formed; and
  - forming first to third blue sub-pixels on other portions of the color filter substrate than the area where the first to third green sub-pixels and the first to third red sub-pixels have been formed.

8. The method of claim 7, wherein the first red sub-pixel, the first green sub-pixel and the first blue sub-pixel are disposed in different columns.

9. The method of claim 7, wherein the pair of second red sub-pixel and third green sub-pixel, the pair of second green sub-pixel and third blue sub-pixel, and the pair of second blue sub-pixel and third red sub-pixel are disposed in different columns.

10. The method of claim 9, wherein the pair of second red sub-pixel and third green sub-pixel, the pair of second green sub-pixel and third blue sub-pixel, and the pair of second blue sub-pixel and third red sub-pixel are disposed in the in the same column respectively.

11. The method of claim 7, wherein the pair of second red sub-pixel and third green sub-pixel implement yellow (Y) color, the pair of second green sub-pixel and third blue sub-pixel implement cyan (C) color, and the pair of second blue sub-pixel and third red sub-pixel implement magenta (M) color.

12. A method for fabricating color filters of a liquid crystal display, comprising:
- providing a color filter substrate; and
- forming a plurality of pixels on the color filter substrate, wherein the forming of the plurality of pixels comprises:
  - forming first to third red color resin layer patterns on the color filter substrate;
  - forming first to third green sub-pixels on other portions of the color filter substrate than the area where the first to third red color resin layer patterns have been formed; and
  - forming first to third blue color resin layer patterns on other portions of the color filter substrate than the area where the first to third green color resin layer patterns and the first to third red color resin layer patterns have been formed.

13. The method of claim 12, wherein the first red color resin layer pattern, the first green color resin layer pattern and the first blue color resin layer pattern are disposed in different columns.

14. The method of claim 12, wherein the pair of second red color resin layer pattern and third green color resin layer pattern, the pair of second green color resin layer pattern and third blue color resin layer pattern, and the pair of second blue color resin layer pattern and third red color resin layer pattern are disposed in different columns.

15. The method of claim 14, wherein the pair of second red color resin layer pattern and third green color resin layer pattern, the pair of second green color resin layer pattern and third blue color resin layer pattern, and the pair of second blue color resin layer pattern and third red color resin layer pattern are disposed in the in the same column respectively.

16. The color filters of claim 1, wherein the pair of second red color resin layer pattern and third green color resin layer pattern implement yellow (Y) color, the pair of second green color resin layer pattern and third blue color resin layer pattern implement cyan (C) color, and the pair of second blue color resin layer pattern and third red color resin layer pattern implement magenta (M) color.

* * * * *